(12) United States Patent
Light

(10) Patent No.: US 12,566,255 B2
(45) Date of Patent: Mar. 3, 2026

(54) OBJECT DETECTION ALARM SYSTEM

(71) Applicant: Life Safety Innovations, LLC,
Statesville, NC (US)

(72) Inventor: Jaime Lee Light, Statesville, NC (US)

( * ) Notice: Subject to any disclaimer, the term of this
patent is extended or adjusted under 35
U.S.C. 154(b) by 555 days.

(21) Appl. No.: 18/050,056

(22) Filed: Oct. 27, 2022

(65) Prior Publication Data
US 2024/0142601 A1 May 2, 2024

(51) Int. Cl.
G01S 13/56 (2006.01)
G08B 13/00 (2006.01)

(52) U.S. Cl.
CPC .............. G01S 13/56 (2013.01); G08B 13/00
(2013.01)

(58) Field of Classification Search
CPC .......... G01S 13/56; G01S 7/521; G01S 15/04;
G01S 15/10; G01S 15/88; G08B 13/00;
G08B 13/1618
See application file for complete search history.

(56) References Cited

U.S. PATENT DOCUMENTS

| | | | | | |
|---|---|---|---|---|---|
| 7,224,276 | B2 * | 5/2007 | Matsudaira | ............... | G08B 1/08 |
| | | | | | 367/199 |
| 7,734,061 | B2 * | 6/2010 | Breed | ..................... | G01S 15/88 |
| | | | | | 348/47 |
| 2008/0282817 | A1 * | 11/2008 | Breed | ............... | B60R 21/01516 |
| | | | | | 73/865.9 |
| 2009/0189751 | A1 * | 7/2009 | Markyvech | ......... | B60R 25/1004 |
| | | | | | 340/426.24 |
| 2016/0019777 | A1 * | 1/2016 | Peterson | ................ | G08B 17/10 |
| | | | | | 340/506 |
| 2020/0064784 | A1 * | 2/2020 | Steiner | ................... | G06V 10/25 |
| 2021/0318660 | A1 * | 10/2021 | Hattori | ................ | G04G 13/021 |
| 2022/0057519 | A1 * | 2/2022 | Goldstein | ............... | G01S 17/88 |

OTHER PUBLICATIONS

Young-Keun Choi, Ki-Man Kim, Ji-Won Jung, Seung-Yong Chun
and Kyu-Sik Park, "Acoustic intruder detection system for home
security," in IEEE Transactions on Consumer Electronics, vol. 51,
No. 1, pp. 130-138, Feb. 2005, (Year: 2005).*

* cited by examiner

*Primary Examiner* — Robert W Hodge
*Assistant Examiner* — Bongani Jabulani Mashele
(74) *Attorney, Agent, or Firm* — Jaensson Law, PLLC;
Monika L. Jaensson, Esq.

(57) ABSTRACT

An object detection alarm system is provided for monitoring
a protected area within a facility to ensure that it remains
free of objects in accordance with federal, state, or local
regulations or facility protocol. The system includes a hous-
ing supporting an ultrasonic sensor, a microcontroller, an
alarm and a clock module. The sensor calculates time
differentials between emitted and detected sonar signals and
generates signals representing the calculated time differen-
tial values or a calculated distance based thereon, supplying
those signals to a processor of the microcontroller which
determines whether a violative condition is present based
upon a comparison of the received signals and a pre-
determined time differential value representing a non-vio-
lative condition. If a violative condition is determined, and
persists for a period of time, the microprocessor activates an
alarm until the condition is cleared. Also provided is a
method of monitoring a protected area within a facility by
means of an object detection alarm system as herein pro-
vided.

13 Claims, 6 Drawing Sheets

FIG 6

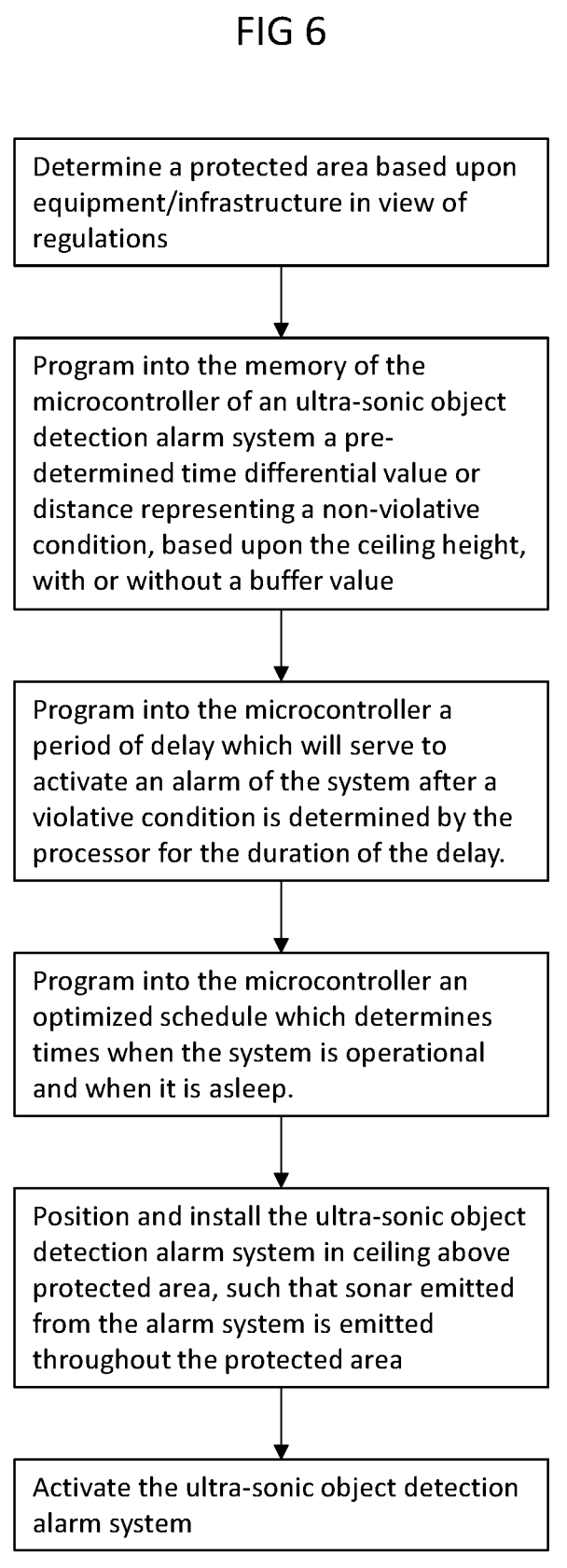

Determine a protected area based upon equipment/infrastructure in view of regulations Program into the memory of the microcontroller of an ultra-sonic object detection alarm system a pre-determined time differential value or distance representing a non-violative condition, based upon the ceiling height, with or without a buffer value Program into the microcontroller a period of delay which will serve to activate an alarm of the system after a violative condition is determined by the processor for the duration of the delay.

Program into the microcontroller an optimized schedule which determines times when the system is operational and when it is asleep.

Position and install the ultra-sonic object detection alarm system in ceiling above protected area, such that sonar emitted from the alarm system is emitted throughout the protected area Activate the ultra-sonic object detection alarm system

OBJECT DETECTION ALARM SYSTEM

FIELD OF INVENTION

The present invention relates generally to electronic sensor devices which sense the presence of objects within an area of interest and, after a delay, sound an audible alarm to alert personnel of a condition in violation of federal, state or local regulations or facility protocol. The invention further relates to methods for monitoring a protected area within a facility to ensure that it remains free of objects and therefore in conformity with federal, state or local regulations or facility protocol.

BACKGROUND

Various local, state and federal regulations require that areas near an emergency exit, fire retardants, and other fixtures, medical gas valves, electrical boxes, equipment and locations within a facility be fully accessible (i.e., that they are free of the presence of items such as boxes and equipment). Hospital and other medical facilities are governed by even more stringent regulations. However, in view of the crisis and emergencies hospital personnel face on a daily basis, often hospital equipment is unfortunately placed and left in these protected areas. Further, upon periodic inspection by regulatory officials, hospitals are often charged with violations based upon their failure to keep these protected areas clear and fully accessible. Presently, some facilities place colored tape or paint on the floor, or install colored flooring, to alert employees and staff of the protected area; however, this approach has had limited effect on maintaining these areas clear of objects.

Therefore, there is a need for a sensor which can sense the presence of objects within a protected area of a facility, and alert nearby personnel that the area is compromised.

Given that transitioning objects and personnel through a protected area within a facility will often be necessary, it would also be desirable to provide a delay in initiating an alarm of the sensed condition, so that the alarm is triggered only after a reasonable period of time for transitional objects and personnel to move through and out of the protected area before an alarm is sounded.

The disclosed technology provides a solution for this continuing safety concern by sensing that a protected area is compromised by an object, and alerting nearby personnel of such condition. Thereby, a safer environment is created for healthcare, nursing homes, schools, hotels and other public facilities.

GENERAL DESCRIPTION

Generally, the disclosed technology is an object detection alarm system for monitoring a protected area within a facility to ensure that it remains free of objects in accordance with federal, state, or local regulations or facility protocol. The system includes a housing with a cover, supporting an ultrasonic sensor, a microcontroller, an alarm and a clock module.

The ultrasonic sensor is provided to monitor a protected area, and cyclically emits sonar signals which reflect off of a ground surface or object present in the protected area, and detects the signals so reflected. The sensor then calculates time differentials between emitted and detected sonar signals and generates signals representing the calculated time differential values.

The microcontroller generally including a processor, memory and input/output ports, and is configured to receive at one of its input ports the signals representing calculated time differential values from the ultrasonic sensor. Both the alarm and the clock module are electronically coupled with the microcontroller. The processor compares the calculated time differential values to a pre-determined time differential value representing a non-violative condition stored in the memory of the microcontroller to determine whether a violative condition is present, and sends a signal to the alarm to generate an audible sound when the processor determines a violative condition persists continuously for a pre-determined period of time, using a clock module electronically communicating with an input port of the microcontroller. The alarm continues to generate the sound until the processor determines that no violative condition exists.

Also disclosed is an object detection alarm system for monitoring a protected area within a facility, similar to the one hereinabove described, wherein the ultrasonic sensor calculates the distance to a ground surface or a sensed object based upon the time differentials between emitted and detected sonar signals, and generates signals representing the distance so calculated. The microcontroller then receives such signals and compares them to a pre-determined distance value representing a non-violative condition stored in the memory of the microcontroller in determining whether a violative condition is present.

The disclosed technology also provides a method for monitoring a protected area within a facility to ensure that it remains free of objects and therefore in conformity with federal, state or local regulations or facility protocol, wherein a protected area within a facility is determined based upon the location of equipment, exits, or otherwise, in view of federal, state and local regulations or facility protocol, and one or more ultra-sonic object detection alarm systems of the disclosed technology are affixed to the ceiling at the protected area such that the sonar emitted from such alarm system or systems is emitted throughout the protected area and capable of detecting objects placed in the protected area. By activating the one or more ultra-sonic object detection systems, the protected area is monitored, and in the event a violative condition persists, an alarm is sounded until the area is cleared.

DESCRIPTION OF THE FIGURES

A full and enabling disclosure of the present devices and methods, including the best mode thereof, directed to one of ordinary skill in the art, is set forth in the specification, which makes reference to the appended figures, in which:

FIG. 6 is an exemplary flow diagram of the method of the disclosed technology.

DETAILED DESCRIPTION

Figure 1:
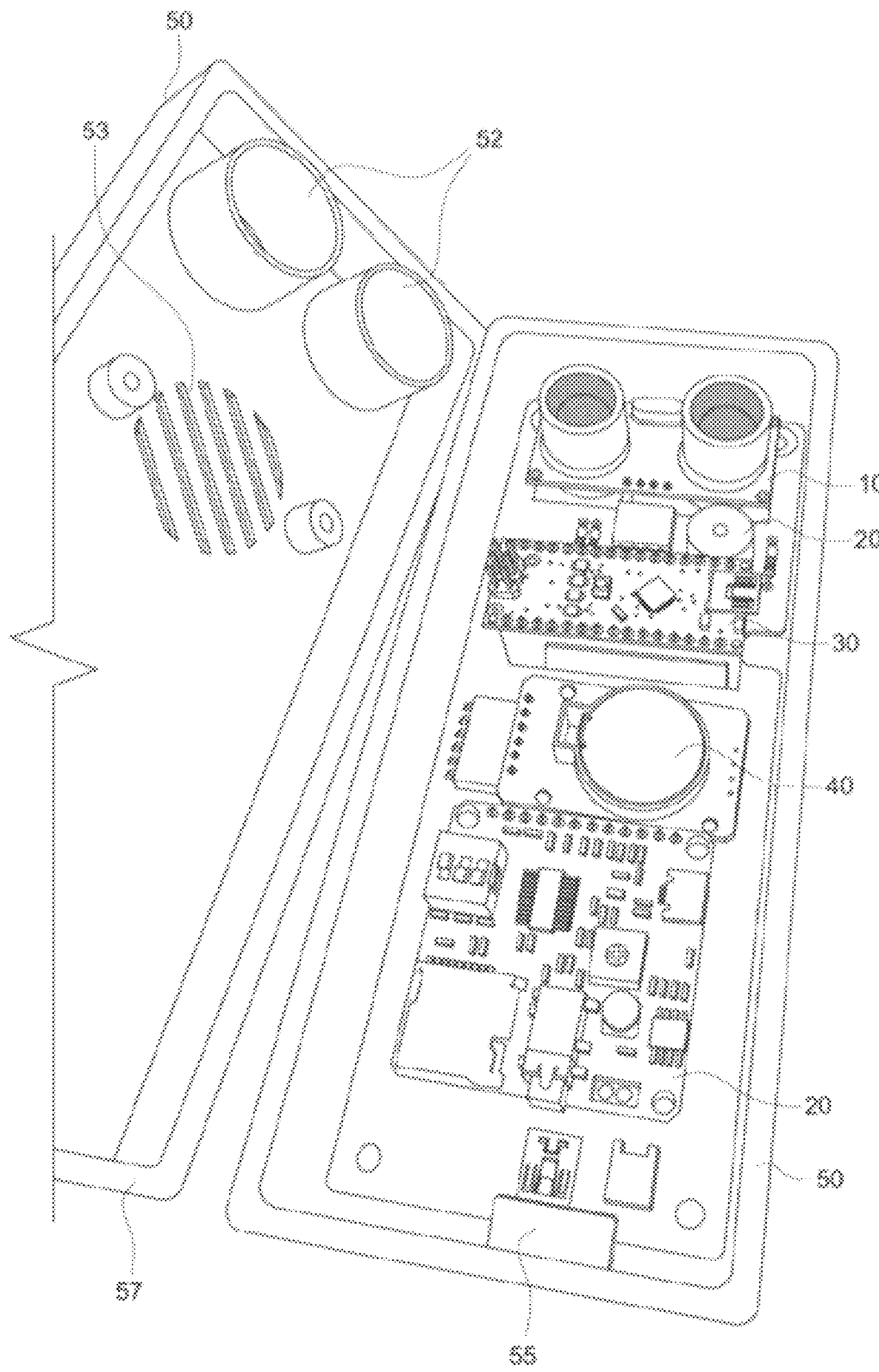
FIG. 1 is a schematic view of an embodiment of an ultra-sonic object detection alarm system of the disclosed technology.
Figure 2:
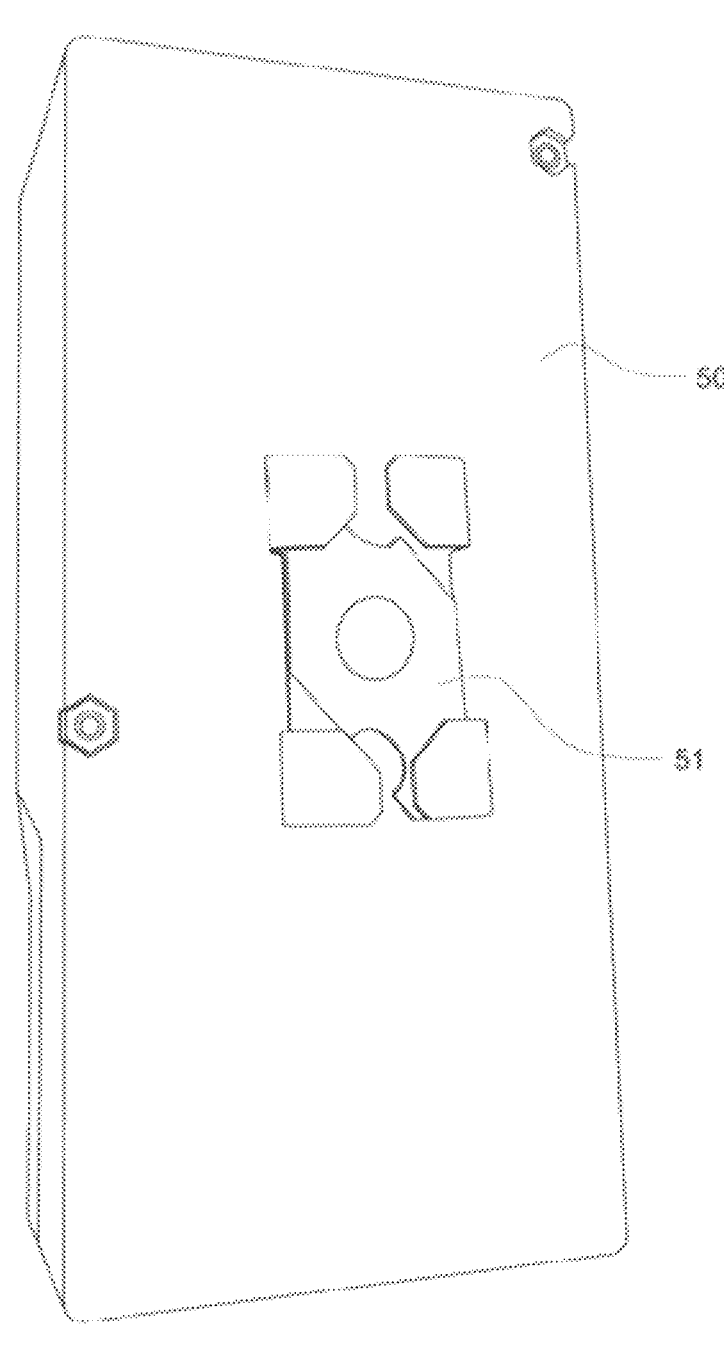
FIG. 2 is a back view of the embodiment of FIG. 1.
Figure 3:
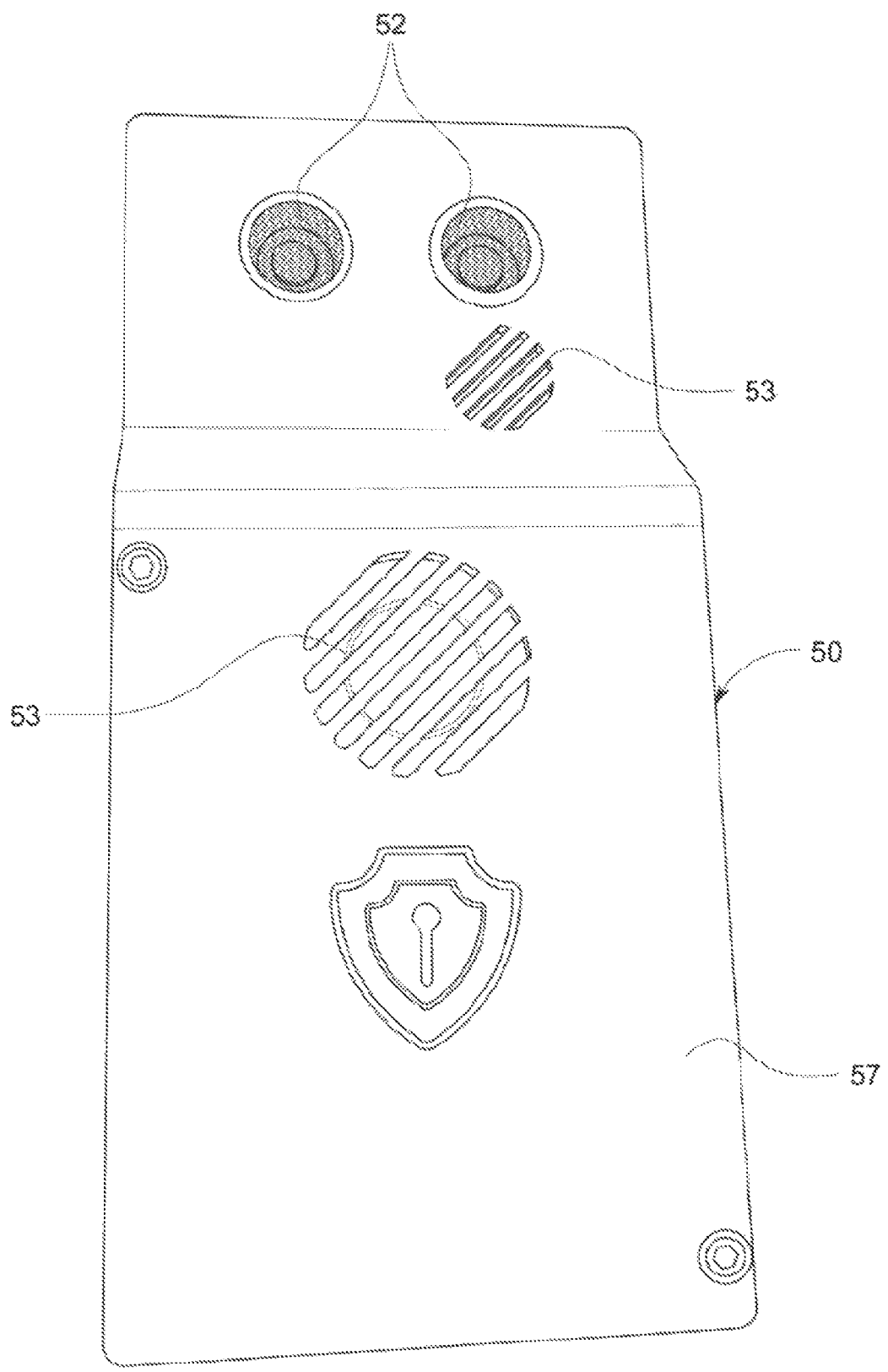
FIG. 3 is a front view of an embodiment of the housing of an ultra-sonic object detection alarm system of the disclosed technology.
Figure 4:
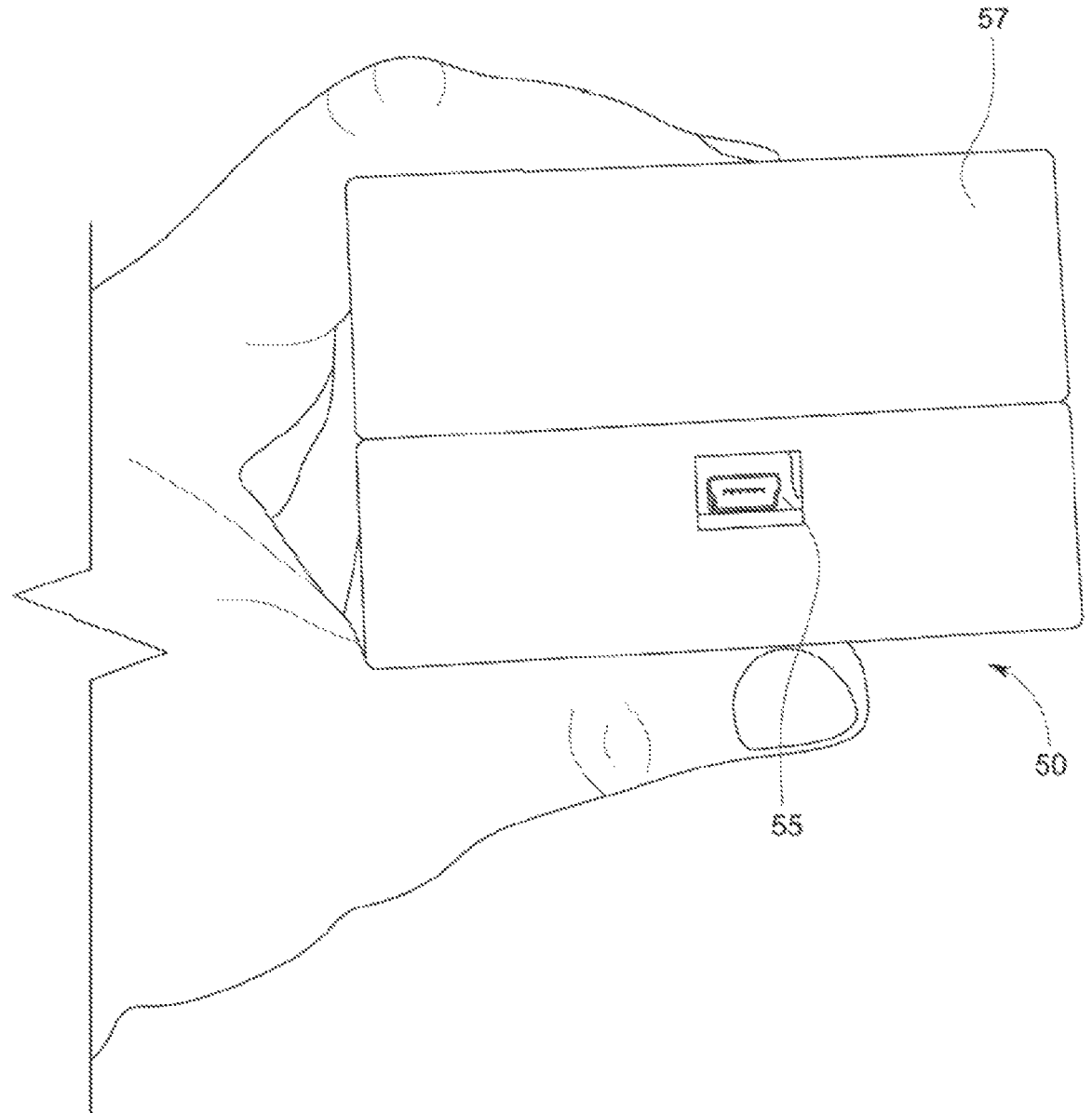
FIG. 4 is an end view of the embodiments of FIGS. 1 and 3.

In accordance with one or more embodiments and as shown in FIG. 1, an object detection alarm system is provided, including an ultrasonic sensor 10 electronically coupled with an alarm 20 to detect items placed in protected areas in violation of federal, state, or local regulations or facility protocol, and alert nearby personnel of the condition. The alarm becomes active after a violative condition is sensed for a pre-determined period of time, and will remain active until the area is clear of the violative condition.

Control of operations of the object detection alarm system of the disclosed technology is provided by a microcontroller 30, generally including a processor, memory and input/output (I/O) ports; a popular microcontroller suitable for use in the disclosed technology is an Arduino Nano.

Figure 5:
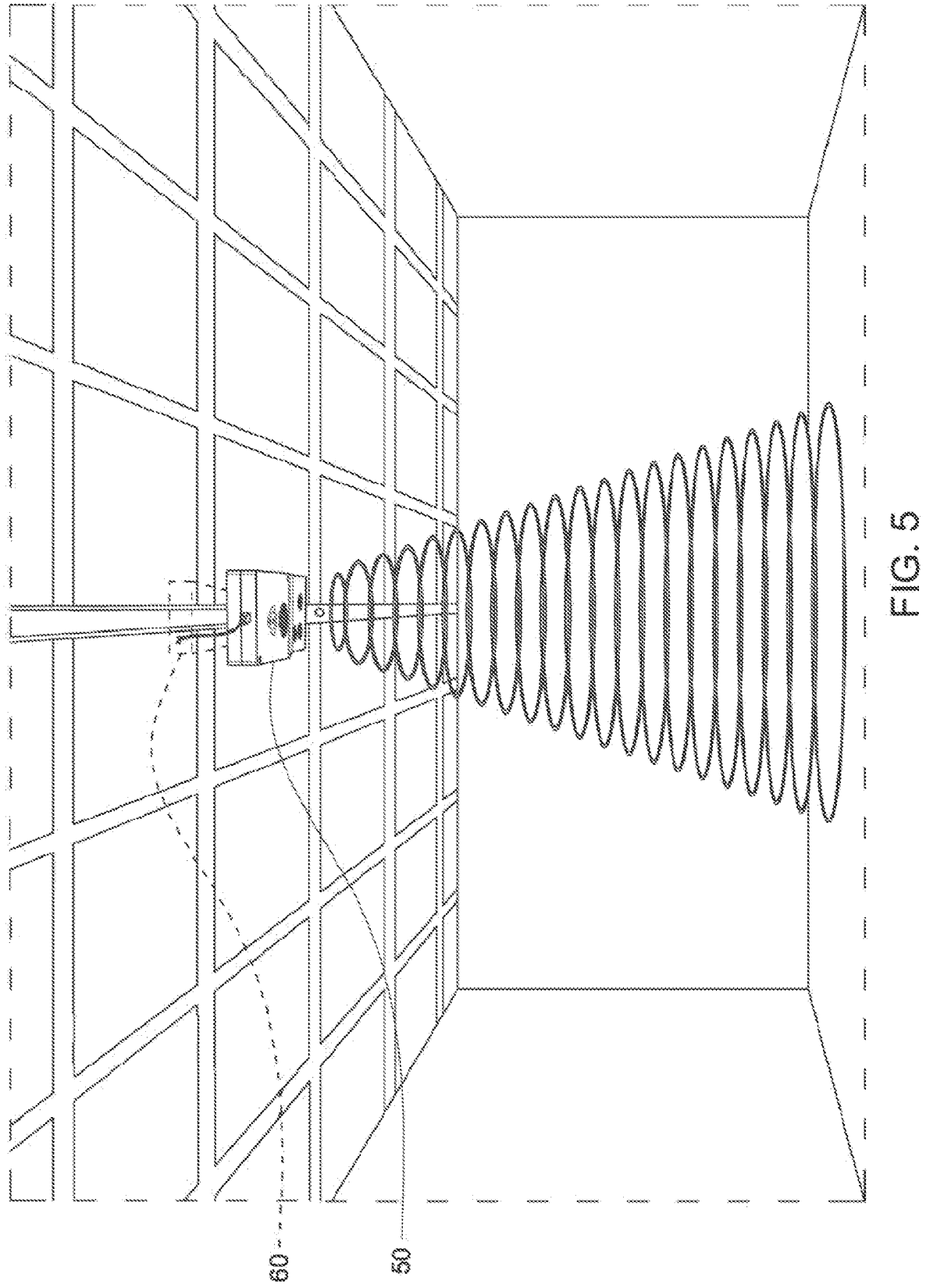
FIG. 5 is a view of the ultra-sonic object detection alarm system of the disclosed technology as installed and defining a protected area monitored by the system.

In operation, and as shown in FIG. 5, the ultrasonic sensor 10 cyclically emits sonar signals which reflect off of the floor of a protected area, or an object/person should one be present, and the signals reflected back are detected by the sensor. The sensor then determines the time differential between the sonar signal emission and the detection of the reflected signal, for each cycle, and supplies the same to the I/O ports of the microcontroller 30.

Suitable ultrasonic sensors include the HC-SR04 ultrasonic sensor, manufactured by Sparkfun Electronics of Niwot, Colorado, which has a ranging distance of up to 4 m, a 30° sensing angle and a 15° angle of effect, and includes two ultrasonic transmitters, which each emit 8 cycle bursts of ultrasound at 40 kHz. This sensor further includes a receiver and a control circuit. Other scanning acoustic or sonar arrays may also be used in the system of the disclosed technology.

As shown in FIG. 5, the vertical and horizontal location of the device (and therefore the sensors) as installed in a facility, relative to the floor area, will determine the time differential for a non-violative condition for programming into the memory of the microcontroller, and the protected whether a violative condition is present. Specifically, a violative condition is determined by the processor if the received data is less than the pre-determined time differential value representing a non-violative condition.

It may be desirable to provide a slight buffer in the sensing of a violative condition when the received time-differential is only slightly less than the pre-determined time differential, such as for example less 1 to 2 milliseconds, in which case the violative condition is determined only when the received time differential is less than the pre-determined time differential by more than the buffer value. Alternatively, the pre-determined time differential value stored in the memory of the microcontroller may account for the buffer value (pre-determined time differential=actual time differential for non-violative condition–buffer value).

In an alternative embodiment, the processor may determine that a violative condition is present by calculating the distance from the reported time differential signal and comparing it to a pre-determined distance value representing a non-violative condition programmed into the memory of the microcontroller (with or without a buffer value), using the formula:

$$\text{Distance}=\Delta time/2*\text{velocity of sound}(1100ft/s)$$

Alternatively, the sensor may calculate the distance value from the reported time differential signal and supply the same to the microcontroller, which can then be compared to the pre-determined distance value representing a non-violative condition.

An example of time differentials and distances measured, calculated, programmed and useful in the disclosed technology, based upon the location of the installation of the system of the disclosed technology, is provided in the following table:

TABLE 1

| Installation Height | Ideal Time Differential | Buffer | Pre-Determined Time Differential | Ideal Distance | Buffer | Pre-Determined Distance |
|---|---|---|---|---|---|---|
| 12 ft | 21.8 msec | 1.8 msec | 20.0 msec | 24 ft | 2 ft | 22 ft |
| 11 ft | 20.0 msec | 1.8 msec | 18.2 msec | 22 ft | 2 ft | 20 ft |
| 10 ft | 18.2 msec | 1.8 msec | 16.4 msec | 20 ft | 2 ft | 18 ft |
| 9 ft | 16.4 msec | 1.8 msec | 14.5 msec | 18 ft | 2 ft | 16 ft |
| 8 ft | 14.5 msec | 1.8 msec | 12.7 msec | 16 ft | 2 ft | 14 ft |
| 7 ft | 12.7 msec | 1.8 msec | 10.9 msec | 14 ft | 2 ft | 12 ft | area being monitored by the system of the disclosed technology. Namely, the distance from the sensor to the ground may be used in calculating the pre-determined time differential value representing a non-violative condition, using the following formula:

$$\Delta time=\text{Distance}*2/\text{velocity of sound}(1100ft/s)$$

Thus, if the sensor is placed 10 feet above the ground, the pre-determined time differential value representing a non-violative condition would be 0.018 seconds.

Similarly, the placement of the object detection alarm system of the disclosed technology relative to the floor determines the area monitored. Therefore, with a sensing angle of 30°, when mounted 10 feet above the floor surface the system may monitor an area of over 100 ft$^2$.

As referenced above, the microcontroller 30 is configured to receive the signal representing the time differential data from the ultrasonic sensor at an I/O port, to temporarily store the data in its memory, and using the processor to compare the received data with a pre-determined time differential value representing a non-violative condition to determine While the ultrasonic sensor 10 may continuously send and receive signals, in cycles (i.e., a burst of emission signals are periodically sent so that there is at least sufficient time to detect the reflected signals from such burst before another burst of emission signals are sent), the same may be optimized by an efficient trigger signal, the timing of which may be controlled by the microcontroller. For example, the trigger signal generated by the microprocessor and sent to the sensor may be more frequent during waking hours or certain shifts and less frequent during sleeping hours. In such a manner, the device of the disclosed technology can efficiently use its supply of electricity, and allow for a quiet environment during sleeping hours. In such embodiments, it would be useful to have a real-time clock or timer module 40 coupled with the processor, to periodically or continuously provide clock time to the processor for purposes of generating and sending the trigger signal in accordance with a programmed optimized schedule.

When a violative condition is determined by the processor, the processor overrides any optimized sensing schedule programmed into the processor and continuously engages in sensing cycles until it no longer determines a violative condition.

Further, the processor assesses whether the determined violative condition persists over a pre-determined period of time for delay (the value of which is stored in the microprocessor memory), using the clock module and/or a delay loop, and if the condition persists over such period of delay the processor generates and sends a signal to the alarm module to generate a sound. Suitable periods of delay range from 1 minute to 5 minutes or more. The sound may be any sound generated by an alarm, or may be a pre-recorded verbal message on an MP3 player, wherein the MP3 player functions as the alarm. Thus, as the microcontroller senses personnel and/or objects transitioning through the protected area, it does not trigger the alarm until the delay time is reached, and the violative condition continuously persists.

The object detection alarm system of the disclosed technology may be wired directly into the facility's main electrical wiring system, or may be battery powered. When battery powered, a battery 60 may be coupled with the system (see, FIG. 5) and stored in the adjacent ceiling area by means of a wire joining the battery to the battery port 55 of the system of the disclosed technology. A suitable battery for purposes of the disclosed invention is a 24V lithium ion rechargeable battery is provided by TalentCell, having an energy charge of almost 43,000 milliampere hours (mAh), which is sufficiently small and lightweight to be used with the device of the disclosed technology, while supplying sufficient electricity to monitor the protected area in accordance with an optimized sensing schedule for 90 to 120 days, as suggested in the following table:

TABLE 2

| Operation Mode | Energy Consumption | Daily Operation | Consumption/ Day | Consumption/ Mos |
|---|---|---|---|---|
| Sleep | 9 mAh | 10 hrs | 90 mAh | 2,700 mAh |
| Sensing | 17 mAh | 13.5 hrs | 229.5 mAh | 6,885 mAh |
| Alarm | 40 mAh | 0.5 hrs | 20 mAh | 600 mAh |
| Total: | | | 339.5 mAh | 10,185 mAh |

As shown in FIGS. 1-4, the components of the object detection alarm system as hereinabove described are mounted within a housing 50, having a mounting bracket 51 which facilitates removable affixation of the device to the ceiling. As shown in the figure, the mounting bracket may be designed to install on a ceiling tile grid; other means of affixing the housing to the ceiling may also be used.

The housing 50 further has a removable cover 57 for purposes of accessing the microcontroller and its components for programming and reprogramming the various programmable elements as herein described. Further, apertures 52 are positioned on the top of the housing and aligned with the ultrasonic sensor to support and protect the same without interfering with the sensor's operation (signaling and detecting). Finally, one or more vented areas 53 are provided on the top of the housing to facilitate transmission of sound from the alarm. When fully assembled, the ultra-sonic detection alarm system weighs about 14 to 15 oz.

A user interface may be coupled with the microcontroller to input the time, set the optimized schedule, buffer and delay, and record a message on an MP3 player, as well as communicate system status information to users, real time.

As shown in FIG. 6, the disclosed technology also comprises a method for monitoring a protected area within a facility to ensure that it remains free of objects and therefore in conformity with federal, state or local regulations or facility protocol. This method includes, first, determining a protected area within a facility based upon the location of equipment, exits, or otherwise, in view of federal, state and local regulations or facility protocol. Next, one or more ultra-sonic object detection alarm systems such as described generally and in embodiments above are affixed to the ceiling near the protected area such that the sonar emitted from such alarm system or systems is emitted throughout the protected area and capable of detecting any objects placed in the protected area. Upon activation, the protected area may now be monitored for violative conditions, and as such violative conditions are detected and persist, trigger an audible alarm to alert nearby personnel that a violative condition exists and must be cleared. Once the system determines that no violative condition exists in the protected area, the audible alarm ceases.

The position of the ultra-sonic object detection alarm systems defines the area sensed (as shown in FIG. 5), and therefore it is important to ensure that the sensed area so defined does not include furniture, walls or other obstructions. The following is a table defining the sensing area, based upon the position of the alarm system and the sensing angle of the ultra-sonic sensor provided with the system:

TABLE 3

| Installed height above floor | Sensing Angle | Sensing Area at floor |
|---|---|---|
| 12 ft | 30° | 151 ft² |
| 12 ft | 45° | 452 ft² |
| 12 ft | 60° | 1,353 ft² |
| 10 ft | 30° | 105 ft² |
| 10 ft | 45° | 314 ft² |
| 10 ft | 60° | 452 ft² |
| 8 ft | 30° | 67 ft² |
| 8 ft | 45° | 201 ft² |
| 8 ft | 60° | 601 ft² |

The preceding discussion merely illustrates the principles of the present object detection alarm system and its method of operation. It will be appreciated that those skilled in the art may be able to devise various arrangements, which, although not explicitly described or shown herein, embody the principles of the inventions and are included within their spirit and scope. Furthermore, all examples and conditional language recited herein are principally and expressly intended to be for educational purposes and to aid the reader in understanding the principles of the inventions and the concepts contributed by the inventor to furthering the art and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawings, which are to be considered part of the entire description of the invention. The foregoing description provides a teaching of the subject matter of the appended claims, including the best mode known at the time of filing, but is in no way intended to preclude foreseeable variations contemplated by those of skill in the art.

The invention claimed is:

1. An object detection alarm system for monitoring a protected area within a facility to ensure that it remains free of objects in accordance with federal, state, or local regulations or facility protocol, the system comprising:

a housing with a cover, the housing supporting an ultrasonic sensor, a microcontroller, an alarm and a clock module;

the ultrasonic sensor being provided to monitor a protected area, wherein the sensor cyclically emits sonar signals which reflect off of a ground surface or object present in the protected area, and detects the signals so reflected, and wherein the sensor calculates time differentials between emitted and detected sonar signals and generates signals representing the time differential values so calculated;

the microcontroller generally including a processor, memory and input/output ports, the microcontroller receiving at one of its input ports the signals representing calculated time differential values from the ultrasonic sensor;

the alarm electronically being coupled with the microcontroller; and the clock module being electronically coupled with the microcontroller;

wherein the processor compares the calculated time differential values to a pre-determined time differential value representing a non-violative condition stored in the memory of the microcontroller to determine whether a violative condition is present, wherein the violative condition indicates a violation of federal, state, or local regulations or facility protocol that require the protected area to remain free of objects; and wherein the processor sends a signal to the alarm to generate an audible sound to alert nearby personnel when the processor determines a violative condition persists continuously for a pre-determined period of time, using the clock module, wherein when a violative condition is determined the processor overrides any optimized sensing schedule and continuously engages in sensing cycles, and wherein the alarm continues to generate the sound until the processor determines that no violative condition exists, based upon signals received from the ultrasonic sensor, indicating the calculated time differential values have returned to within a threshold of the pre-determined time differential value representing a non-violative condition, and the processor sends a signal to the alarm to cease generating the sound.

2. The object detection alarm system of claim 1, wherein when comparing the predetermined time differential value representing a non-violative condition with the calculated time differential values received from the sensor, the processor applies a buffer value so that a violative condition is only determined when the calculated time differential values is less than the difference between the pre-determined time differential value of a non-violative condition and the buffer value.

3. The object detection alarm system of claim 1, wherein the pre-determined time differential value is a time differential value representing a non-violative condition less a buffer value.

4. The object detection alarm system of claim 1, wherein the ultrasonic sensor cyclically emits sonar signals only when it receives a trigger signal from the processor; wherein the clock module supplies the time to the processor of the microcontroller, and the processor sends trigger signals to the ultrasonic sensor in accordance with an optimized schedule stored in the memory of the microcontroller;

and wherein the processor overrides the optimized schedule upon determination of a violative condition and the ultrasonic sensor continues to emit sonar signals until the processor determines that no violative condition exists.

5. The object detection alarm system of claim 1, wherein the alarm is an MP3 player capable of storing a pre-recorded message.

6. The object detection alarm system of claim 1, further comprising a lithium ion battery.

7. An object detection alarm system for monitoring a protected area within a facility to ensure that it remains free of objects in accordance with federal, state, or local regulations or facility protocol, the system comprising:

an ultrasonic sensor to monitor a protected area, wherein the sensor cyclically emits sonar signals which reflect off of a ground surface or object present in the protected area, and detects the signals so reflected, and wherein the sensor calculates time differentials between emitted and detected sonar signals, calculates therefrom the distance the signals traveled and were reflected, and generates signals representing the distance values so calculated;

a microcontroller generally including a processor, memory and input/output ports, the microcontroller receiving at one of its input ports the signals representing the distance values from the ultrasonic sensor;

an alarm electronically coupled with the microcontroller; and a clock module electronically coupled with the microcontroller;

wherein the processor compares the distance values to a pre-determined distance value representing a non-violative condition stored in the memory of the microcontroller to determine whether a violative condition is present, wherein the violative condition indicates a violation of federal, state, or local regulations or facility protocol that require the protected area to remain free of objects; and wherein the processor sends a signal to the alarm to generate an audible sound to alert nearby personnel when the processor deter-mines a violative condition persists continuously for a pre-determined period of time, using the clock module, wherein when a violative condition is determined the processor overrides any optimized sensing schedule and continuously engages in sensing cycles, and wherein the alarm continues to generate the sound until the processor determines that no violative condition exists, based upon further signals received from the ultrasonic sensor indicating the distance values have returned to within a threshold of the pre-determined distance value representing a non-violative condition, and the processor sends a signal to the alarm to cease generating the sound.

8. The object detection alarm system of claim 7, wherein when comparing the distance value representing a non-violative condition with the calculated distance values received from the sensor, the processor applies a buffer value so that a violative condition is only determined when the calculated distance is less than the difference between the pre-determined distance value of a non-violative condition and the buffer value.

9. The object detection alarm system of claim 7, wherein the pre-determined distance value is a distance value representing a non-violative condition less a buffer value.

10. The object detection alarm system of claim 7, wherein ultrasonic sensor cyclically emits sonar signals only when it receives a trigger signal from the processor; wherein the clock module supplies the time to the processor of the microcontroller, and the processor sends trigger signals to the ultrasonic sensor in accordance with an optimized schedule; and wherein, the processor overrides the optimized schedule upon determination of a violative condition and the ultrasonic sensor continues to emit sonar signals until the processor determines that no violative condition exists.

11. The object detection alarm system of claim 7, wherein the alarm is an MP3 player capable of storing a pre-recorded message.

12. The object detection alarm system of claim 7, further comprising a lithium ion battery.

13. A method for monitoring a protected area within a facility to ensure that it remains free of objects and therefore in conformity with federal, state or local regulations or facility protocol, the method comprising the steps of:

a. determining a protected area within a facility based upon the location of equipment, exits, or otherwise, in view of federal, state and local regulations or facility protocol, wherein the regulations or protocol require the protected area to remain free of objects;

b. affixing one or more ultra-sonic object detection alarm systems to a ceiling near the protected area such that the sonar emitted from such alarm system or systems is emitted throughout the protected area and capable of detecting objects placed in the protected area, wherein each of the one or more ultra-sonic object detection alarm system comprises:

i. a housing with a cover, the housing supporting an ultrasonic sensor, a microcontroller, an alarm and a clock module;

ii. the ultrasonic sensor being provided to monitor a protected area, wherein the sensor cyclically emits sonar signals which reflect off of a ground surface or object present in the protected area, and detects the signals so reflected, and wherein the sensor calculates time differentials between emitted and detected sonar signals and generates signals representing the time differential values so calculated;

iii. the microcontroller generally including a processor, memory and input/output ports, the microcontroller receiving at one of its input ports the signals representing calculated time differential values from the ultrasonic sensor;

iv. the alarm being electronically coupled with the microcontroller; and v. the clock module being electronically coupled with the microcontroller;

vi. wherein the processor compares the calculated time differential values to a pre-determined time differential value representing a non-violative condition stored in the memory of the microcontroller to determine whether a violative condition is present; and vii. wherein the processor sends a signal to the alarm to generate an audible sound to alert nearby personnel when the processor deter-mines a violative condition persists continuously for a pre-determined period of time, using the clock module, wherein when a violative condition is determined the processor overrides any optimized sensing schedule and continuously engages in sensing cycles, and wherein the alarm continues to generate the sound until the processor determines that no violative condition exists, based upon signals received from the ultrasonic sensor indicating the calculated time differential values have returned to within a threshold of the pre-determined time differential value representing a non-violative condition, and the processor sends a signal to the alarm to cease generating the sound; and c. activating the one or more ultra-sonic object detection systems.

\* \* \* \* \*